United States Patent [19]
DeVault et al.

[11] Patent Number: 5,205,136
[45] Date of Patent: Apr. 27, 1993

[54] TRIPLE-EFFECT ABSORPTION REFRIGERATION SYSTEM WITH DOUBLE-CONDENSER COUPLING

[75] Inventors: Robert C. DeVault, Knoxville, Tenn.; Wendell J. Biermann, Fayetteville, N.Y.

[73] Assignee: Martin Marietta Energy Systems, Inc., Oak Ridge, Tenn.

[21] Appl. No.: 850,364

[22] Filed: Mar. 11, 1992

[51] Int. Cl.$^5$ .................................. F25B 15/00
[52] U.S. Cl. ............................ 62/476; 62/101
[58] Field of Search .......................... 62/101, 476

[56] References Cited
U.S. PATENT DOCUMENTS

| | | | |
|---|---|---|---|
| 3,266,266 | 8/1966 | Reid | 62/476 |
| 3,742,728 | 7/1973 | Mamiya | 62/476 |
| 4,439,999 | 4/1984 | Mori et al. | 62/476 |
| 4,520,634 | 6/1985 | Oouchi et al. | 62/476 |
| 4,531,374 | 7/1985 | Alefeld | 62/79 |
| 4,542,628 | 9/1985 | Sarkisian et al. | 62/335 |
| 4,551,991 | 11/1985 | Miyoshi et al. | 62/476 |
| 4,732,008 | 3/1988 | DeVault | 62/79 |
| 4,827,728 | 5/1989 | DeVault et al. | 62/79 |

Primary Examiner—Albert J. Makay
Assistant Examiner—William C. Doerrler
Attorney, Agent, or Firm—J. Donald Griffin; Harold W. Adams

[57] ABSTRACT

A triple effect absorption refrigeration system is provided with a double-condenser coupling and a parallel or series circuit for feeding the refrigerant-containing absorbent solution through the high, medium, and low temperature generators utilized in the triple-effect system. The high temperature condenser receiving vaporous refrigerant from the high temperature generator is double coupled to both the medium temperature generator and the low temperature generator to enhance the internal recovery of heat within the system and thereby increase the thermal efficiency thereof.

18 Claims, 4 Drawing Sheets

TRIPLE-EFFECT ABSORPTION REFRIGERATION SYSTEM WITH DOUBLE-CONDENSER COUPLING

This invention was made with the support of the United States Government under contract No. DE-AC05-84OR21400 awarded by the U. S. Department of Energy, Office of Building Technologies. The United States Government has certain rights in this invention.

BACKGROUND OF THE INVENTION

The present invention relates generally to an improved triple-effect absorption refrigeration system and method, and more particularly to such a system which utilizes three generators with a double-condenser coupling that is provided by coupling the high temperature condenser with both the medium temperature generator and the low temperature generator to provide improved internal heat recovery and thereby increasing the thermal efficiency of the system.

Absorption refrigeration systems which typically utilize hydrocarbon fuels, such as natural gas or oil, as the system-operating heat source have undergone considerable modifications in recent years in order to increase the thermal efficiency or the coefficient of performance (COP) of the system and thereby improving the economics of operating the system on hydrocarbon fuels. The modifications were usually made to the basic commercial absorption refrigeration system which utilizes a single-effect absorption system that typically comprises a desorber or generator, a condenser, an evaporator, and an absorber coupled together. In the single-effect system the working fluid or refrigerant-absorbent solution, commonly known as a solution pair, is heated in the generator by an external heat source, normally the combustion of a hydrocarbon fuel, to vaporize the refrigerant from the solution and concentrate the absorbent liquid. The concentrated absorbent liquid is returned to the absorber while the vaporized refrigerant is condensed to liquid in the condenser and then evaporated in the evaporator to provide the desired refrigeration effect. The COP of a single-effect absorption refrigeration system is typically in the range of about 0.6 to 0.7.

An increase in the COP of absorption refrigeration systems was provided by the development of the double-effect absorption system in which two generators are coupled to the absorber with the second generator being operable at a higher temperature and pressure than the first generator. In this system the high temperature generator is externally heated while the first generator is heated by the heat rejected during the condensation of the vaporized refrigerant from the high temperature generator in the high temperature condenser. This arrangement effectively utilizes the external heat energy in both generators to provide an increase in the COP up to about 1.0 to 1.3.

A modification of the double-effect absorption refrigeration system was provided by the development of the dual-loop absorption system which utilizes two separate but complete refrigeration absorption units or loops operating at different temperatures with at least the condenser in the higher temperature loop being in heat exchange relationship with the generator in the lower temperature loop to provide the source of heat for operating the entire lower temperature loop. Such a dual loop system is described in U.S. Pat. No. 4,542,628 and has a COP approximately the same as that of the double-effect absorption refrigeration system.

A triple-effect absorption refrigeration system as described in U.S. Pat. No. 4,732,008 also combines two single-effect absorption circuits in a manner wherein the components of the system are arranged differently from the dual loop system described above for utilizing the externally applied heat three times to produce the desired cooling effect in the evaporator.

The development of multiple-effect absorption refrigeration systems also includes a triple-effect system wherein three generators and condensers are utilized. The generators are coupled to a single absorber while the condensers are individually coupled to a single evaporator. A typical triple-effect system utilizing such a three generator arrangement is described in U.S. Pat. No. 4,531,374 (FIG. 44G). The three sets of generators and condensers function at different temperatures and pressures. External heat is applied to the high temperature or third generator while heat rejection from the high temperature or third condenser is used to heat the medium temperature or second generator. Also, the heat of condensation from the medium temperature or second condenser is used to heat the low temperature or first generator. The condensed refrigerant from the first, second, and third condensers is evaporated in the evaporator to provide the desired refrigeration effect. The COP for such a triple-effect system is about 1.3 which corresponds to the higher thermal efficiencies provided by the double-effect and dual-loop, double-effect systems described above.

SUMMARY OF THE INVENTION

An object of the present invention is to further increase the thermal efficiency and economics of absorption refrigeration systems by providing a triple-effect absorption refrigeration system and method which utilizes a double-condenser coupling to improve the internal recovery of heat and thereby increase the thermal efficiency of the system over known triple-effect absorption refrigeration systems of the three generator type such as described in the aforementioned U.S. Pat. No. 4,531,374.

Another object of the present invention is to provide such a double-condenser coupled triple-effect absorption refrigeration system and method in which the solution pair is fed through a series or parallel flow arrangement to the three generators.

Generally, the triple-effect absorption refrigeration system of the present invention which is provided with a double-coupled condenser comprises first, second and third generator means, first, second and third condensing means, evaporating means, and absorber means operatively coupled together and with the first, second and third condensing means adapted to respectively receive vaporous refrigerant from the first, second and third generator means. Means are provided for heating a refrigerant-containing absorption solution, such as water and lithium-bromide, in the third generator means to a first refrigerant-vaporizing temperature. First heat exchange means are operatively associated with the third condensing means and the second generator means for heating refrigerant-containing absorption solution in the second generator means to a second refrigerant-vaporizing temperature that is lower than the first refrigerant-vaporizing temperature. Second heat exchange means are operatively associated with the second condensing means and the first generator means for providing heat to the refrigerant-containing absorption solution in the first generator means. Heat transfer means are provided for combining heat from the liquid refrigerant condensed in the third condensing means with the heat provided to the refrigerant containing solution in the first generator means by the second heat exchange means for heating the refrigerant-containing solution in the first generator means to a third refrigerant-vaporizing temperature that is lower than the second temperature.

The heat transfer means in one embodiment of the invention comprises third heat exchange heat operatively associated with the third condensing means and the first generator means for supplementing the heating of the refrigerant-containing solution in the first generator means as provided by the second heat exchange means. The third condensing means comprises both vapor condensing means for condensing to liquid the vaporous refrigerant received by the third condensing means and liquid cooling means coupled to the vapor condensing means for receiving and extracting heat from the liquid refrigerant.

The heat transfer means in another embodiment of the present invention comprises means for combining a stream of the condensed refrigerant from the third condensing means with a stream of vaporous refrigerant from the second generator means prior to the combined streams being received by the second condensing means. The means for combining the streams of condensed and vaporous refrigerant comprise first and second conduit means that respectively couple the second condensing means to the second generator means for receiving the stream of vaporous refrigerant therefrom and the third condensing means to the first conduit means for combining the stream of condensed refrigerant from the third condensing means with the stream of vaporous refrigerant from the second generator means.

In the operation of both embodiments of the present invention, the steps comprise: heating the refrigerant-containing solution in the third generator means to a first temperature for vaporizing the refrigerant; utilizing heat from the third condensing means for heating the refrigerant-containing solution in the second generator means to a second refrigerant-vaporizing temperature that is lower than the first temperature; and utilizing heat from the third condensing means with heat provided to the second condensing means by the vaporous refrigerant from the second generator means for heating refrigerant-containing solution in the first generator means to a third refrigerant-vaporizing temperature that is lower than said second temperature.

Other and further objects of the present invention will become obvious upon an understanding of the illustrative embodiments about to be described or will be indicated in the appended claims, and various advantages not referred to herein will occur to one skilled in the art upon employment of the invention in practice.

Figure 1:
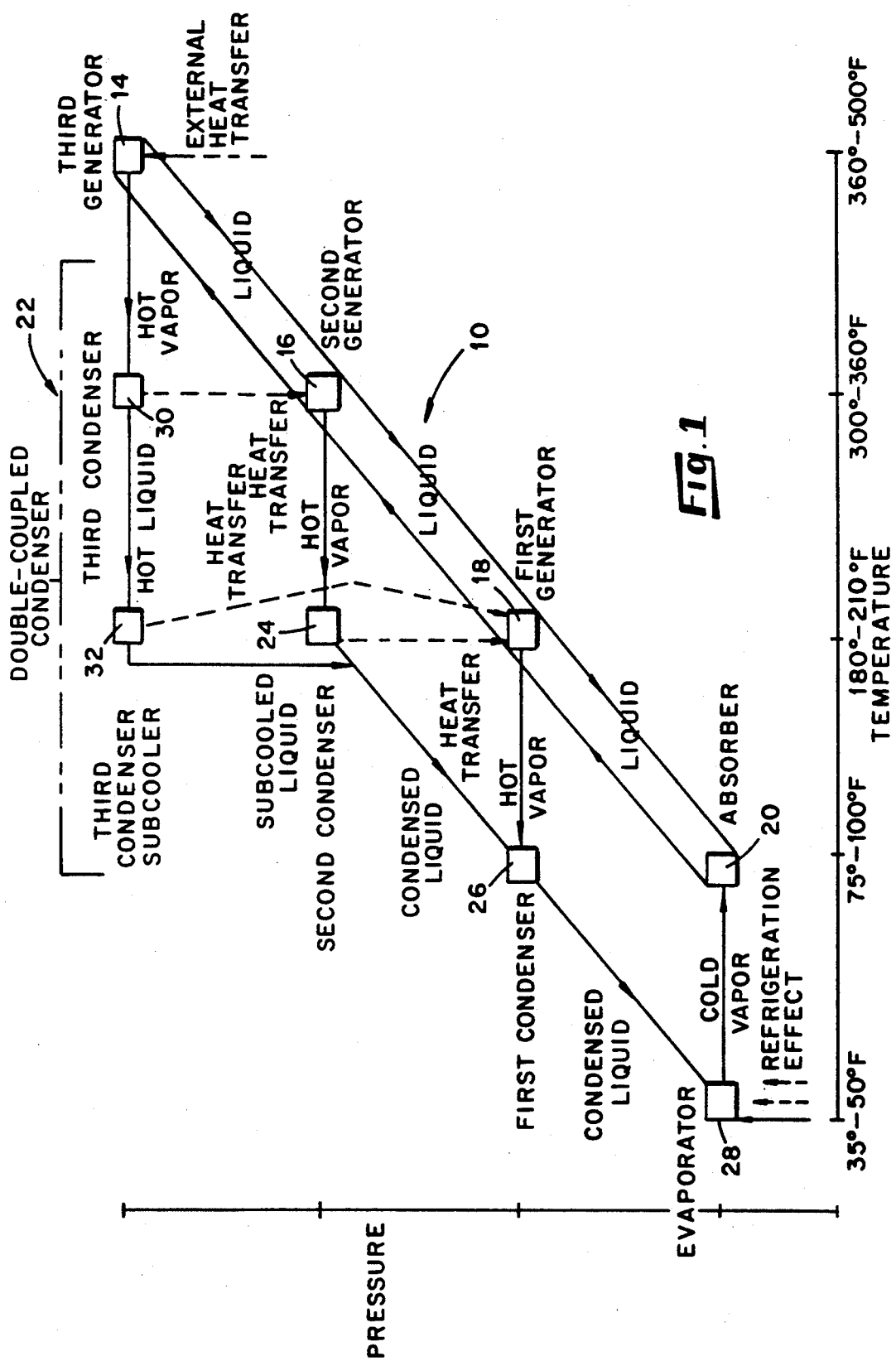
FIG. 1 is a schematic representation of a first embodiment of the present invention as provided by a triple-effect absorption refrigeration system utilizing a double-coupled condenser and illustrates the thermodynamic relationships of the various system components.

Preferred embodiments of the invention have been chosen for the purpose of illustration and description. The preferred embodiments illustrated are not intended to be exhaustive nor to limit the invention to the precise forms shown. The preferred embodiments are chosen and described in order to best explain the principles of the invention and their application and practical use to thereby enable others skilled in the art to best utilize the invention in various embodiments and modifications as are best adapted to the particular use contemplated. For example, the embodiments illustrated in the drawings and described below preferably utilize a parallel flow arrangement for feeding each of the three generators with selected portions of the weak refrigerant-containing solution from the absorber. However, it is to be understood that the three generators can be so coupled to the absorber so as to receive the weak refrigerant-containing solution therefrom in a series flow arrangement. Also, while the embodiment of FIGS. 1 and 2 employs a parallel flow arrangement for conveying the condensed refrigerant to the evaporator from the three condensers and the embodiment of FIGS. 3 and 4 employs a series flow arrangement for conveying the condensed refrigerant to the evaporator from the first and second condenser, it will appear clear that either embodiment can utilize a series or parallel flow arrangement for conveying the condensed refrigerant to the evaporator.

DETAILED DESCRIPTION OF THE INVENTION

As briefly described above the present invention is directed to a triple-effect absorption refrigeration system employing a double-coupled condenser which provides an improvement in the thermal efficiency over previous triple-effect systems utilizing three generators.

The two embodiments of the present invention described below utilize a significant number of similar or essentially similar components that are identified by employing similar reference numerals. Thus, the description of any component in the system of one embodiment is applicable to a corresponding component of the other system as identified by the same reference numeral with any differences between any similarly numbered components in the two embodiments being described during the description thereof.

With reference to the pressure-temperature diagram of FIG. 1, the first embodiment of the triple-effect, double-coupled condenser absorption refrigeration system of the present invention is generally shown at 10 and comprises a high temperature or third generator 14, a medium temperature or second generator 16, and a low temperature or first generator 18 which are coupled to an absorber 20 for receiving a stream of weak refrigerant-containing absorption solution therefrom. The triple-effect system 10 also includes a high temperature or third condenser 22, a medium temperature or second condenser 24, and a low temperature or first condenser 26 with these condensers being respectively coupled by piping or conduits to the third, second, and first generators 14, 16, and 18 for receiving and condensing vaporized refrigerant from the generators. Each condenser operates at the same or substantially the same pressure as the generator from which it receives vaporized refrigerant. An evaporator 28 is coupled to the condensers for receiving the condensed refrigerant therefrom for providing the desired refrigeration effect. The vaporous refrigerant from the evaporator 28 is passed into the absorber 20 for absorption by the concentrated absorbent liquid returned to the absorber 20 from the generator for repeating the cycle.

In previous triple-effect systems, once the refrigerant is condensed to liquid it is conveyed to the evaporator. However, the triple-effect system of the present invention as provided by the first embodiment of FIGS. 1 and 2 and the second embodiment of FIGS. 3 and 4 differ from these previous systems in that sensible heat in condensed refrigerant at the high temperature condenser is extracted for heating the first generator. In the first embodiment of the present invention, the third condenser 22 is formed of two condenser components, the first being a condenser 30 which is used to condense the hot vaporized refrigerant from the third generator 14 with this heat of condensation being transferred to the second generator 16 to boil-off or vaporize refrigerant therein. The second component of the third condenser 22 is a subcooler 32 which receives the hot condensed liquid from the condenser 30. The subcooler 32 is coupled in a heat exchange relationship with the first generator 18 so that sensible heat remaining in the hot liquid from the condenser 30 can be extracted and used for heating the refrigerant-containing solution in the first generator 18. By utilizing this double-coupled condenser as defined by coupling the third condenser 22 to both the second generator 16 and the first generator 18, a significant amount of the heat in the condensed liquid from the high temperature condenser that would be otherwise lost, is internally recovered in the system for increasing the thermal efficiency of the system. Further, the internal recovery of heat from the condensed liquid at the third condenser obviates or significantly reduces any external cooling demands such as previously required for cooling the liquid refrigerant from the third condenser prior to the introduction of the liquid refrigerant into the evaporator 28.

The refrigerant and the absorbent utilized to form the solution pair useable in either embodiment of the present invention is preferably water and lithium bromide but any suitable commercially available solution pair including the use of various additives such as corrosion inhibitors may be utilized in the practice of the present invention.

The generators 14, 16, and 18 are coupled by suitable piping or conduits to the absorber 20 in either a series type or a parallel type flow arrangement. In a type 1 series flow arrangement the refrigerant-containing absorption solution, typically referred to as the weak solution, is serially passed through the first, second, and third generators 14, 16, and 18 and then returned to the absorber 20. In a type 2 series flow arrangement, the weak solution is first passed from the absorber 20 to the third generator 14 and then serially returned to the absorber 20 through the second generator 16 and the first generator 18. The utilization of either of these series-type flow arrangements requires a considerable expenditure in the construction of the refrigeration system due to the additional requirements needed for passing and heating all of the refrigerant-containing solution in each of the generators. Also, the additional heat exchange area within the various generators as required for series flow arrangements causes some circulation losses to occur. Accordingly, the refrigerant-containing solution is preferably fed to the three generators 4, 16, and 18 by using a parallel flow arrangement wherein only a selected portion of the weak solution is delivered to each generator. This parallel flow arrangement provides for a substantial reduction in the cost of the system components.

However, one significant gain realizable by employing a series flow arrangement for feeding the three generators with the weak refrigerant containing solution is that lower generator temperatures can be utilized. Under some conditions the use of lower generator temperatures with a series flow arrangement may outweigh the slight gains realized in the COP provided by using a parallel flow arrangement, particularly since other cycle quantities in the series flow arrangement can be changed to improve the COP thereof. For example, in a computer modeling operation the size of the heat exchange area in the generators in a 240 ton triple-effect system of the present invention utilizing a parallel flow arrangement having seventy-two tubes with the first, second, and third generators respectively containing 20, 21, and 31 tubes is 115.4, 121.2, and 178.9 square feet, respectively. With a weak refrigerant-containing solution flow-rate of 849 lbs/min. the system is provided with a calculated COP of 1.671 and a maximum generator temperature of 449° F.

The equal distribution of the same seventy-two tubes among the three generators (twenty-four tubes in each generator —138.5 square feet) with the same feed rate of the weak refrigerant containing solution provided a slight increase of the calculated COP to 1.68 and a lower maximum generator temperature of 442.7° F. With a series-type flow arrangement in the same size of the triple-effect system and having a similar distribution of tubes and weak solution feed rate, the COP is 1.384 and a maximum generator temperature of 441.7° F. Thus, while the parallel flow arrangement is preferred over the series flow arrangements, it is to be understood that the double-condenser coupling feature of the present invention is effective for increasing the thermal efficiency of the triple-effect systems using either the series-type or the parallel-type flow arrangements.

Figure 2:
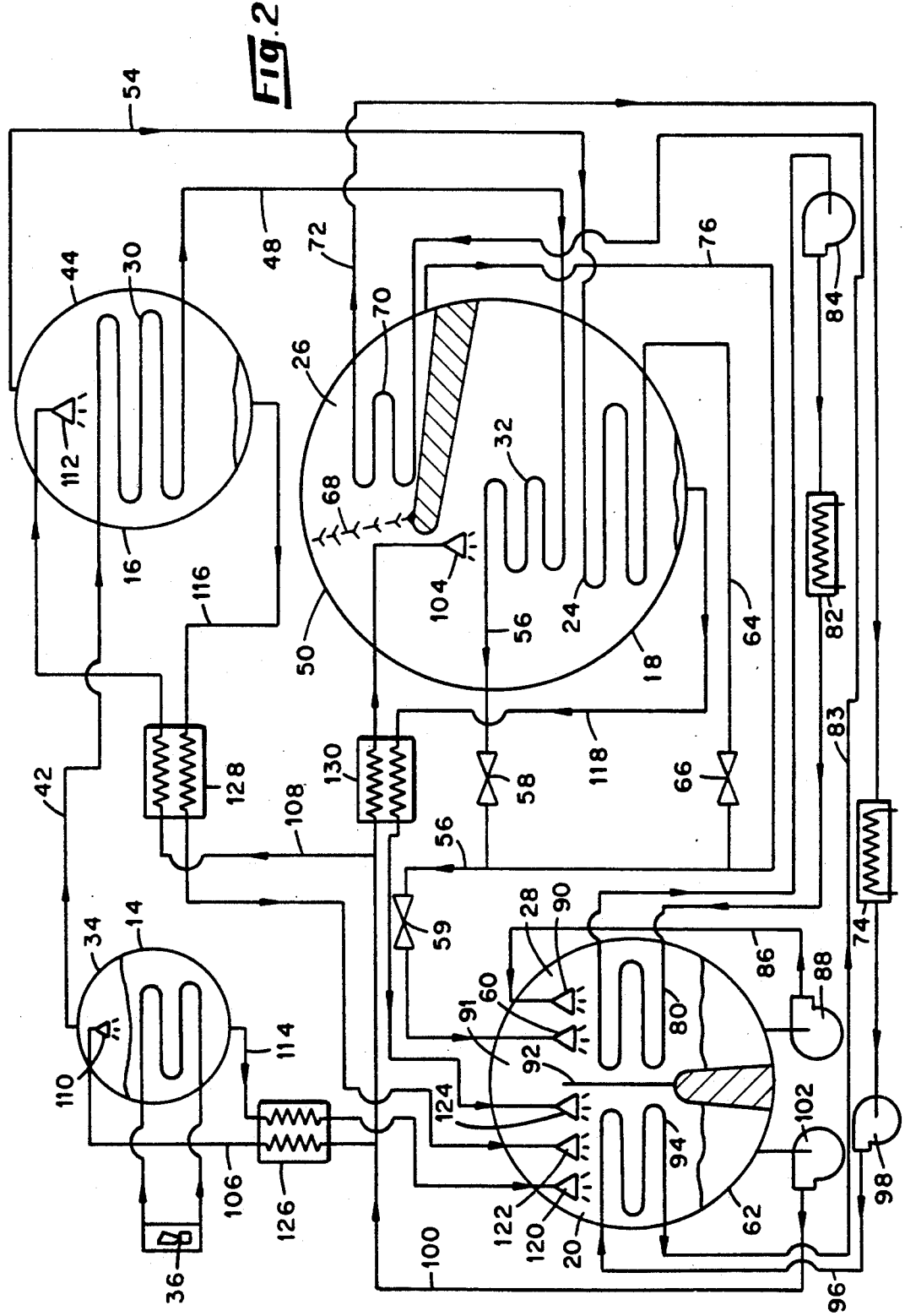
FIG. 2 is a schematic view of the apparatus of the first embodiment of the present invention and illustrating the structural arrangement of components in a triple-effect absorption refrigeration system incorporating a double-coupled condenser.

In the apparatus of the first embodiment of the present invention as illustrated in FIG. 2, the third generator 14 is shown contained within a shell or housing 34. A burner 36 which operates on a hydrocarbon fuel, such as natural gas or oil, is used to provide a stream of hot fluid which is in heat exchange relationship with the weak refrigerant-containing solution conveyed into the generator housing 34. The external heating of the weak solution is sufficient to effect the vaporization or boil-off of the refrigerant from the absorbent liquid to concentrate the latter in the base portion of the third generator 14. The external heating of the refrigerant-containing solution in the third generator 14 considered sufficient is provided by heating the weak solution to a temperature in the range of about 360°–500° F., with about 425° F. being a typical temperature realized and 500° F. being a desired temperature. When heating the weak solution to temperatures greater than about 400°

F., corrosion problems may occur so as to necessitate the use of corrosion resistant materials such as monel in the fabrication of the high temperature components. The vaporous refrigerant resulting from the vaporization of the weak solution in the high temperature generator 14 flows through conduit 42 into a coiled portion of the conduit defining the condenser 30, the first component of the two-component third condenser 22, contained within the housing 44 of the second generator 16. The heat of condensation rejected from the condensing refrigerant vapor in condenser 30 is transferred to the weak refrigerant-containing solution within the second generator 16 for vaporizing the refrigerant contained therein. The hot condensate or liquid refrigerant resulting from the condensation of the refrigerant vapor in the condenser 30 is at a temperature in the range of about 300°–360° F. and is conveyed through conduit 48 into a coiled portion of this conduit defining the subcooler 32, the second component of the two-component condenser 22, which is at the same pressure as the condenser 30 and the third generator 14. The subcooler 32 defined by coiled tubing is contained within housing 50 of the first generator 18 so that sensible heat in the hot liquid discharged from the high temperature condenser 30 can be recovered internally by transferring such heat to the weak solution employed in the first generator 18. This heat transfer from the hot refrigerant liquid to the weak solution in the first generator 18 via the subcooler 32 is used in combination with the heat of condensation provided by the condensation of vaporous refrigerant discharged from the second generator 16 for vaporizing the portion of weak solution employed in the first generator 18. The hot refrigerant vapor from the second generator 16 is passed through conduit 54 into the second condenser 24 which is contained within housing 50. Typically, the weak solution in the first generator 16 heated to a temperature in the range of about 180°–210° F. which is sufficient to boil-off the refrigerant.

The relatively cool liquid refrigerant discharged from the subcooler 32 is at a temperature in the range of about 180°–210° F. and flows through conduit 56, pressure reducer or flow restricter 58, expansion valve 59, and spray head 60 into the evaporator 28 contained in the evaporator-absorber housing 62. The condensed refrigerant from the condenser 24 which is at a temperature closely corresponding to that of the liquid discharged from the subcooler 32, flows through conduit 64 containing a flow restricter 66 and then into conduit 56 where it is combined with the refrigerant liquid from the subcooler 32 for delivery into the evaporator 28 through the spray head 60.

The first condenser 26 is contained within housing 50 of the first generator 18 and is coupled to the latter through a demister 68. The vaporous refrigerant released in the first generator 18 passes through the demister 68 and is condensed to liquid by heat exchange coil 70 connected by conduit 72 to an external coolant source such as a water cooling tower as generally shown at 74 and as conventionally used in absorption refrigeration systems. The condensed refrigerant leaving the first condenser 26 is at a temperature of about 75°–100° F. and is conveyed through conduit 76 into conduit 56 where it mixes with the liquid from the subcooler 32 and the second condenser 24 for delivery as a combined flow into the evaporator 28 through the spray head 60.

The evaporation of the liquid refrigerant sprayed into the evaporator provides for cooling the refrigerant to a temperature of about 35°–50° F., the cooling effect of which can be extracted from the evaporator by employing an evaporator coil 80 disposed in a heat exchange relationship with a suitable work load envisioned for the refrigeration device as generally indicated by the heat exchanger at 82. A conduit 83 and pump 84 circulates a heat transfer medium such as water through the evaporator coil 80 and passed the heat exchanger 82.

To enhance the evaporation of the refrigerant in the evaporator, the refrigerant liquid within the evaporator is recirculated through the evaporator 28 by employing a conduit 86 containing a pump 88 and a spray head 90.

Refrigerant vapor in the evaporator 28 flows into the absorber 20 section of the housing 62 through an opening 91 in a vertical partition 92 which separates the evaporator 28 from the absorber 20. This refrigerant vapor is then absorbed by the concentrated absorbent liquid contained in the absorber 20 so as to dilute or weaken the absorbent solution which is conveyed into the three generators. To facilitate the absorption of the refrigerant vapor by the absorbent solution in the absorber 20, a cool liquid such as water from the exemplary cooling tower 74 may be circulated via conduit 96 through a coil 94 mounted in the absorber 20. The conduit 96 is provided with a suitable circulation pump 98 which is also shown as being used to circulate the coolant from the cooling tower 74 through the first condenser 26.

The weak solution is discharged from the base of the absorber 20 and is circulated through the generators 14, 16, and 18 to provide for the vaporization and removal of the refrigerant from the absorbent and the return of the concentrated absorbent liquid to the absorber 20. As pointed above, the circulation of the weak solution from the absorber may be achieved in any of three ways such as provided by series flow (types 1 and 2) or by parallel flow, with the use of a parallel flow circulating system being preferred in the triple-effect double-condenser coupled absorption refrigeration system of the present invention. A parallel flow circuit for the distribution of the refrigerant-containing solution from the absorber 20 to the generators 14, 16, and 18 and the return of the concentrated absorbent liquid from the generator is shown in FIG. 2. This parallel flow circuit comprises a conduit 100 which conveys the refrigerant-contained solution discharged from the base of the absorber through a suitable pump 102 to a spray head 104 in the first generator 18. This conduit 100 is intersected at locations between the absorber 20 and the first generator 18 by conduits 106 and 108 which are respectively coupled to spray heads 110 and 112 in the third generator 14 and the second generator 16. The concentrated absorbent liquid produced in the third, second, and first generators 14, 16, and 18 is shown being returned to the absorber 20 through separate conduits 114, 116, and 118. Also, these conduits 114, 116, and 118 are shown provided with spray heads 120, 122, and 124 at the ends thereof within the evaporator-absorber housing 62. However, the separate conduits 114, 116, and 118 would preferably be joined together near the absorber 20 and provided with a single spray head within the absorber housing. Heat exchangers 126, 128 and 130 are also provided in this parallel circuit at certain locations between the conduits 106 and 114, the conduits 108 and 116, and the conduits 100 and 118 so that heat can be transferred from the concentrated absorbent liquid discharged from the generators to the weak solution entering the generators. Such a heat exchange arrangement decreases the extent of solution heating required for the vaporization of the refrigerant in the generators and the extent of cooling of the concentrated absorbent liquid entering the absorber 20, thereby increasing the thermal efficiency of the system.

In the operation of the first and second embodiments of a triple-effect absorption refrigeration system utilizing parallel flow and the double-condenser coupling of the present invention, the distribution of the weak solution from the absorber 20 to the generators is preferably provided in such a manner that the system will provide a high level of efficiency. For example, the third generator 14 will receive a preselected amount in the range of about 40 to 45 percent (preferably about 42.5 percent) of the weak solution, the second generator will receive a preselected amount in the range of about 25 to 35 percent (preferably about 30 percent) of the weak solution, and the first generator will receive a preselected amount in the range of about 25 to 30 percent (preferably about 27.5 percent) of the weak solution. By employing the weak solution in the generators in such preselected proportions for providing the desired level of efficiency, the parallel flow arrangements shown in FIGS. 2 and 4 will, as described above, provide a calculated COP of approximately 1.68 at a maximum generator temperature of about 443° F. This COP represents an increase of about 20 percent over the COP of approximately of 1.38 obtained in a series flow triple-effect refrigeration system employing the double-condenser coupling and with a maximum generator temperature of about 442° F. On the other hand, such a series flow system while not as efficient as a parallel flow system still provides about 9 percent increase in COP over a conventional triple-effect, three generator, series flow system as previously known.

Figure 3:
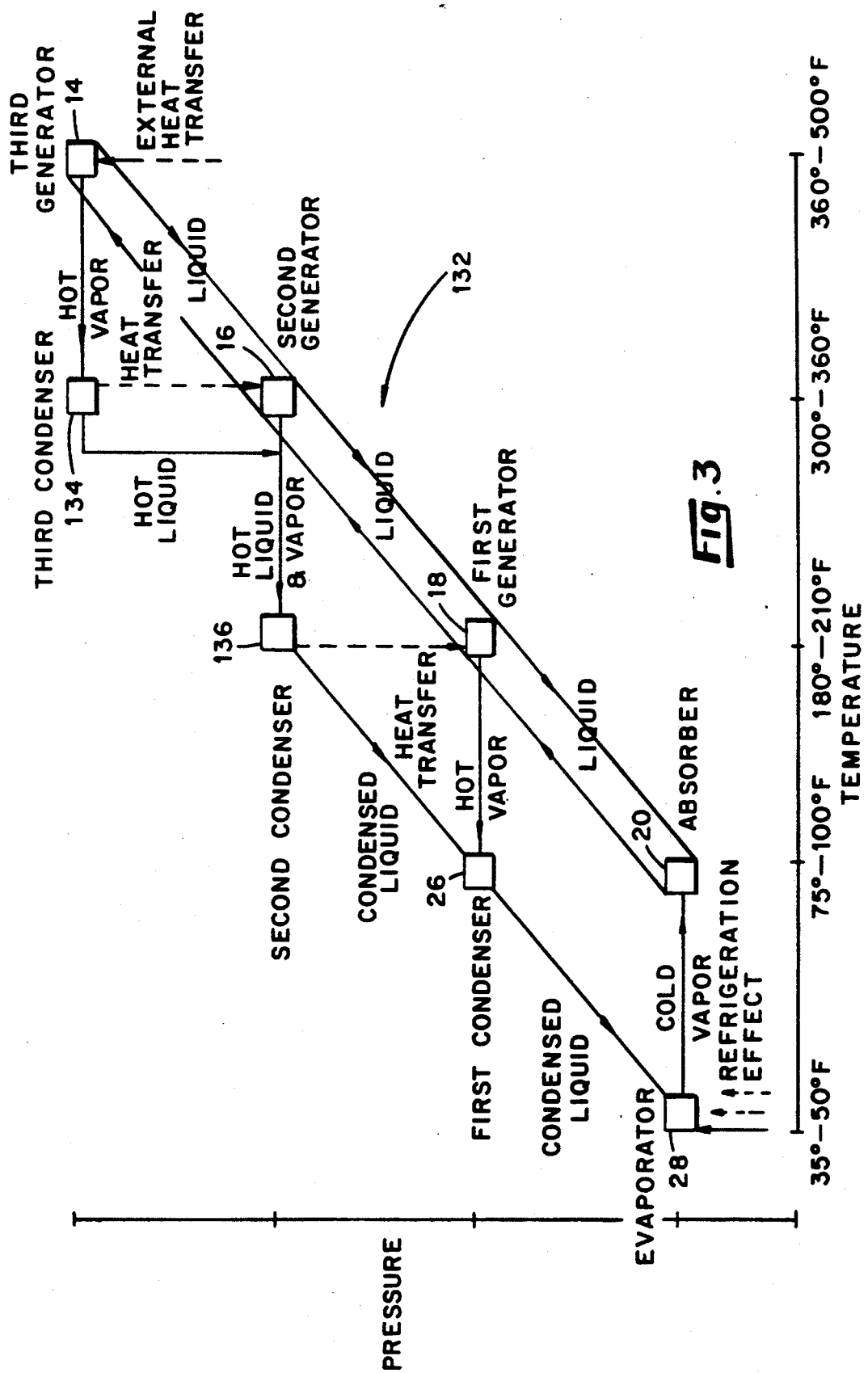
FIG. 3 is a schematic representation of a second embodiment of the present invention illustrating the thermo-dynamic relationships of a triple-effect absorption refrigeration system provided with a double-coupled condenser.

With reference to the pressure-temperature diagram of FIG. 3 directed to the second embodiment of the triple-effect, double-coupled condenser absorption refrigeration system of the present invention as generally shown at 132 and comprises a third generator 14, second generator 16, and a first generator 18 which are coupled to an absorber 20 for receiving refrigerant-containing absorption solution therefrom in a manner similar to the embodiment of FIGS. 1 and 2. The triple-effect system 132 also includes a third condenser 134, a second condenser 136, and a first condenser 26 respectively coupled to the third, second, and first generators 14, 16, and 18 for receiving and condensing vaporized refrigerant from the generators. As with the embodiment of FIGS. 1 and 2, each condenser operates at the same or substantially the same pressure as the generator from which it receives vaporized refrigerant. The condensers are serially coupled to the evaporator 28 for conveying the condensed refrigerant thereinto for providing the desired refrigeration effect.

Figure 4:
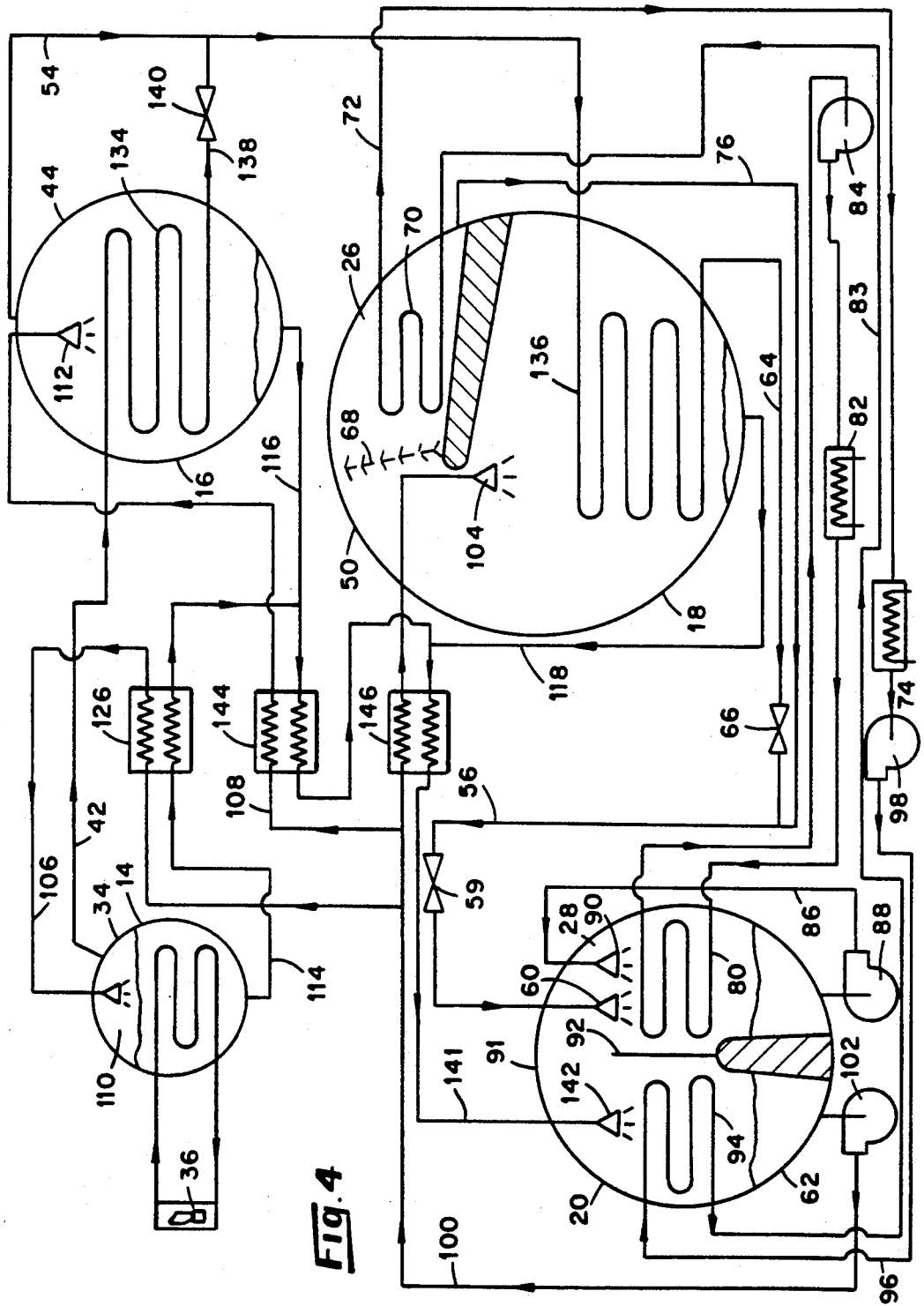
FIG. 4 is a schematic view of the apparatus of the second embodiment of the present invention directed to a triple-effect absorption refrigeration system having a double-coupled condenser and illustrating the structural arrangement of the system components.

In accordance with the embodiment of FIGS. 3 and 4 of the present invention, the third condenser 134 is used to condense the hot vaporized refrigerant from the third generator 14 with this heat of condensation being transferred to the second generator 16 to boil-off or vaporize refrigerant therein. The stream of condensed refrigerant from the third condenser 134 is combined with the stream of vaporous refrigerant from the second generator 16 through a suitable pressure reducing means before the vaporous refrigerant reaches the second condenser 136. The combined streams of refrigerant pass through the second condenser 136 which is in a heat exchange relationship with the refrigerant-containing solution with the first generator 18 so that sensible heat remaining in the hot condensed refrigerant from the third condenser 134 can be extracted and used in conjunction with the heat from the vaporous refrigerant from the second generator 16 for heating the refrigerant-containing solution in the first generator 18. Thus, the combining of the stream of condensed refrigerant from the third condenser 134 with the vaporous refrigerant from the second generator 16 provides for the recovery of a significant amount of the heat in the condensed liquid from the high temperature condenser 134 that would be otherwise lost so as to increase the thermal efficiency of the system. Further, the internal recovery of heat in the condensed liquid discharged from the third condenser 134 obviates or significantly reduces any external cooling demands such as previously required for cooling the liquid refrigerant from the third condenser 134 prior to the introduction of the liquid refrigerant into the evaporator 28.

In the apparatus of the second embodiment of the present invention as illustrated in FIG. 4, the external heating of the weak refrigerant-containing solution in the third generator 14 and the temperatures encountered during the vaporization of refrigerant from the weak refrigerant-containing solution are similar to those of the embodiment of FIGS. 1 and 2. The vaporous refrigerant discharged from the high temperature generator 14 flows through conduit 42 into a coiled portion of the conduit defining the third condenser 134 contained within the housing 44 of the second generator 16. The stream of hot condensed refrigerant resulting from the condensation of the refrigerant vapor in the third condenser 134 is at a temperature in the range of about 300°–360° F. and is discharged from the third condenser 134 through conduit 138 which is connected to conduit 54 and used for conveying the vaporous refrigerant from the second generator 16 to the second condenser 136 contained in housing 50 of the first generator 18. Through this connection of conduit 138 with conduit 54, the hot condensed refrigerant from the high temperature condenser 134 is combined with the vaporous refrigerant from the second generator 16.

The pressure of the condensed refrigerant stream discharged from the third condenser 134 through conduit 138 is at a pressure higher than that of the stream of vaporous refrigerant discharged from the second generator 16 through conduit 54. Thus, in order to effectively combine these streams at the juncture between conduits 138 and 54, a suitable pressure reducing means 140, such as a fixed orifice plate, is placed in conduit 138, preferably at a location near the junction with conduit 54, for reducing the pressure of the condensed refrigerant discharging from conduit 138 to the same or substantially the same pressure as the vaporous refrigerant in conduit 54.

In this second embodiment, the condensed refrigerant from the second condenser 136, as defined by coils in conduit 54, is discharged through conduit 64 containing a pressure reducing means 66 and is then combined with the condensed refrigerant in conduit 76 discharged from the first condenser 26 for delivery to the evaporator 28 through conduit 56.

In the embodiment of FIGS. 3 and 4 the concentrated absorbent liquid produced in the third, second, and first generators 14, 16, and 18 is returned to the absorber 20 through conduits 114, 116, and 118 which are serially joined to form conduit 141 provided with a spray head 142 at the end thereof within the evaporator-absorber housing 62. Heat exchangers 126, 144, and 146 are also provided in this return circuit for the concentrated absorbent and are respectively positioned at certain locations between the conduits 106 and 114, the conduits 108 and 116, and the conduits 100 and 118 so that heat can be transferred from the concentrated absorbent liquid discharged from the generators to the weak solution entering the generators. These heat exchangers 146 and 144 essentially correspond to heat exchangers 128 and 130 of the FIGS. 1 and 2 except that the concentrated absorbent from the third generator 14 and the second generator 16 flows through heat exchanger 144 and the concentrated absorbent from all three generators flows through heat exchanger 146.

As described above the operating temperatures and pressures for the second embodiment are the same or substantially the same as those of the first embodiment and that these embodiments differ from one another primarily in the mechanism used for the double-coupled condenser. Thus, except for the double-coupled condenser mechanism and the heat exchange arrangement employed between the weak solution and the concentrated absorbent, the balance of the embodiment of FIGS. 3 and 4 is preferably structurally similar to the embodiment of FIGS. 1 and 2.

It will be seen that the present invention provides an improved triple-effect absorption refrigeration system which yields significant increases in the COP over known triple-effect absorption refrigeration systems without undergoing extensive and/or expensive system modifications. Further, the size and cost of the components used in the triple-effect absorption refrigeration system using a parallel feed arrangement are substantially less than in a similar system using a series feed arrangement. Another advantage of the triple-effect, double-coupled condenser absorption refrigeration system is that the optimum distribution of the weak refrigerant-containing solution to the three generators remains nearly constant as the load on the system varies or as the cooling tower water undergoes changes in temperatures. Thus, the subject system obviates the use of complex valving for controlling the flow and distribution of the weak solution as heretofore required for maintaining optimum system efficiency.

What is claimed is:

1. A multiple-effect absorption refrigeration system having a double-coupled condenser, said system comprising:

first, second and third generator means, first, second and third condensing means, evaporating means, and absorber means operatively coupled together and with the first, second and third condensing means adapted to respectively receive vaporous refrigerant from the first, second and third generator means for condensing the vaporous refrigerant;

means for heating refrigerant-containing absorption solution in the third generator means to a first refrigerant-vaporizing temperature;

first heat exchange means operatively associated with the third condensing means and the second generator means for heating refrigerant-containing absorption solution in the second generator means to a second refrigerant-vaporizing temperature that is lower than said first temperature;

second heat exchange means operatively associated with the second condensing means and the first generator means for providing heat to the refrigerant-containing adsorption solution in the first generator means; and heat transfer means for combining heat from refrigerant condensed in the third condensing means with the heat provided to the refrigerant-containing solution in the first generator means by the second heat exchange means for heating the refrigerant-containing solution in the first generator means to a third refrigerant-vaporizing temperature that is lower than said second temperature, said heat transfer means comprising means for combining the condensed refrigerant from the third condensing means with vaporous refrigerant from the second generator means prior to being received by the second condensing means.

2. A method for operating a multiple-effect absorption refrigeration system comprising first, second and third generator means and condensing means, evaporating means, and absorber means operatively coupled together and with the first, second and third condensing means respectively receiving and condensing hot vaporous refrigerant from the first, second and third generator means, said method comprising:

heating refrigerant-containing absorption solution in the third generator means to a first temperature for vaporizing refrigerant contained therein;

utilizing heat from the third condensing means for heating refrigerant-containing absorption solution in the second generator means to a second refrigerant-vaporizing temperature that is lower than said firs temperature; and utilizing heat form the third condensing means with heat provided to the second condensing means by combining a stream of condensed from the third condensing means with a stream of vaporous refrigerant form the second generator means the vaporous refrigerant form the second generator means prior to the reception of the vaporous refrigerant by the second condensing means for heating refrigerant-containing absorption solution in the first generator means to a third refrigerant-vaporizing temperature that is lower than said second temperature.

3. A multiple-effect absorption refrigeration system having a double-coupled condenser as claimed in claim 1, wherein said first, second and third generator means are adapted to operate at temperatures and pressures different from one another.

4. A multiple-effect absorption refrigeration system having a double-coupled condenser as claimed in claim 1, wherein the first, second and third generator means are coupled in a series flow arrangement with the absorber means for receiving refrigerant-containing absorption solution therefrom.

5. A multiple-effect absorption refrigeration system having a double-coupled condenser as claimed in claim 4, wherein the first, second and third generator means are coupled in a series flow arrangement with the absorber means for conveying concentrated absorption solution thereinto, and wherein heat exchange means are operatively associated with the series flow arrangement for transferring heat from the concentrated absorption solution to the refrigerant containing solution.

6. A multiple-effect absorption refrigeration system having a double-coupled condenser as claimed in claim 1, wherein the first, second and third generator means are coupled in parallel to the absorber means for providing each generator means with a selected portion of the refrigerant-containing absorption solution.

7. A multiple-effect absorption refrigeration system having a double-coupled condenser as claimed in claim 6, wherein the first, second and third generator means are each adapted to receive a preselected amount of the refrigerant-containing absorption solution from the absorber means with said preselected amount being in the range of about 25–30 percent, about 25–35 percent, and about 40–45 percent, respectively, for the first, second, and third generator means.

8. A multiple-effect absorption refrigeration system having a double-coupled condenser as claimed in claim 1, wherein said first temperature is in a temperature range of about 360° F. to about 500° F., wherein said second temperature is in a temperature range of about 300° F. to about 360° F., and wherein said third temperature is in a temperature range of about 180° F. to about 210° F.

9. A multiple-effect absorption refrigeration system having a double-coupled condenser as claimed in claim 1, wherein the second condensing means are coupled by first conduit means to the second generator means for receiving a stream of vaporous refrigerant therefrom, and wherein second conduit means couple the third condensing means to the first conduit means for combining a stream of condensed refrigerant from the third condensing means with the stream of vaporous refrigerant from the second generator means.

10. A multiple-effect absorption refrigeration system having a double-coupled condenser as claimed in claim 9, wherein pressure reducing means are operatively associated with the second conduit means for reducing the pressure of the condensed refrigerant in the second conduit means to substantially the same pressure as that of the vaporous refrigerant in the first conduit means prior to the combining of the streams of condensed refrigerant and vaporous refrigerant.

11. A multiple-effect absorption refrigeration system having a double-coupled condenser as claimed in claim 10, wherein said pressure reducing means is provided by orifice means disposed in the second conduit means adjacent to the coupling of the second conduit means to the first conduit means.

12. A multiple-effect absorption refrigeration system having a double-coupled condenser as claimed in claim 10, wherein the temperature of the combined streams of refrigerant is substantially the same as said second temperature.

13. A method for operating a multiple-effect absorption refrigeration system as claimed in claim 2, wherein the refrigerant-containing absorption solution comprises water and lithium bromide.

14. A method for operating a multiple-effect absorption refrigeration system as claimed in claim 2, including the step of coupling the first, second and third generator means in a series flow arrangement with the absorber means for providing each of said generator means with refrigerant-containing absorption solution from the absorber means.

15. A method for operating a multiple-effect absorption refrigeration system as claimed in claim 14, including the steps of coupling the first, second and third generator means in a series flow arrangement with the absorber means for conveying concentrated refrigerant absorption solution from each of said generator means thereinto, and passing the concentrated refrigerant absorption solution in heat exchange with the refrigerant-containing absorption solution for heating the latter prior to being received by each of said generator means.

16. A method for operating a multiple-effect absorption refrigeration system as claimed in claim 2, wherein the first, second and third generator means are coupled in a parallel flow arrangement with the absorber means for receiving refrigerant-containing absorption solution therefrom, and including the step of respectively providing the first, second and third generator means with preselected amounts of the refrigerant-containing absorption solution in the range of about 25–30 percent, about 25–35 percent, and about 40–45 percent of the total refrigerant-containing absorption solution provided thereto from the absorber means.

17. A multiple-effect absorption refrigeration system having a double-coupled condenser as claimed in claim 2, wherein said first temperature is in a temperature range of about 360° F. to about 500° F. wherein said second temperature is in a temperature range of about 300° F. to about 360° F., wherein said third temperature is in a temperature range of about 180° F. to about 210° F.

18. A method for operating a multiple-effect absorption refrigeration system as claimed in claim 2, including the step of reducing the pressure of the stream of condensed refrigerant from the third condensing means to substantially the pressure of the stream of vaporous refrigerant from the second generator means prior to combining the refrigerant streams.

* * * * *